(12) United States Patent
Kuramatsu

(10) Patent No.: US 6,215,414 B1
(45) Date of Patent: Apr. 10, 2001

(54) RADIO SELECTIVE PAGER

(75) Inventor: Hiroyasu Kuramatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/090,929

(22) Filed: Jun. 5, 1998

(30) Foreign Application Priority Data

Jun. 6, 1997 (JP) .................................................. 9-149658

(51) Int. Cl.[7] .................................................... G08B 5/22

(52) U.S. Cl. ............................... 340/825.44; 340/825.47; 340/825.48; 375/368

(58) Field of Search .................. 340/825.44, 825.47, 340/825.48; 375/368

(56) References Cited

U.S. PATENT DOCUMENTS

| | | | |
|---|---|---|---|
| 4,961,073 | 10/1990 | Drapac et al. | 340/825.44 |
| 5,440,298 | * 8/1995 | Kuramasu | 340/825.44 |
| 5,734,686 | * 3/1998 | Kuramatsu | 375/368 |

FOREIGN PATENT DOCUMENTS

| | | |
|---|---|---|
| 0 601 697 A2 | 6/1994 | (EP) . |
| 0 607 037 A2 | 7/1994 | (EP) . |
| 4-035 537 | 2/1992 | (JP) . |
| 6-326649 | 11/1994 | (JP) . |

OTHER PUBLICATIONS

Williams, L. I: "System Integration of the Flex Paging Protocol" Mobile Radio Technology, col. 14, No. 6, Jun. 1, 1996, p. 10 12, 14, 16, XP000595298, ISSN: 0745–7626.

* cited by examiner

*Primary Examiner*—Michael Horabik
*Assistant Examiner*—Yves Dalencourt
(74) *Attorney, Agent, or Firm*—Sughrue, Mion, Zinn, Macpeak & Seas, PLLC

(57) ABSTRACT

A radio selective pager capable of preventing an erroneous synchronization with received signals of different transmission rates to avoid an erroneous switch operation from a power saving mode to a continuous receiving mode, improving power saving efficiency and prolonging life of an internal battery. A bit synchronizer synchronizes bits of demodulation data output from a receiver with an internal reference clock. A preamble detector detects a preamble of demodulation data output from the bit synchronizer, and a frame signal detector detects a frame synchronizing signal. When an address number of the demodulation data is coincident with an individual address number stored in an address comparator, a controller controls an indicator to indicate a selective paging to a user. A bit rate detector detects leading and trailing change points of bits of the demodulation data, counts a detection number of at least ones of the leading and trailing change points held within change point detection windows, recognizes the received signal to be of a predetermined transmission rate when the count number is coincident with a predetermined value, and instructs the indicator to do the paging operation to the user.

14 Claims, 7 Drawing Sheets

(a) CHANGE POINT DETECTION WINDOWS
(b) 2400 bps BIT DATA STRING
(c) DISCRIMINATION RESULT
(d) 1600 bps BIT DATA STRING
(e) DISCRIMINATION RESULT

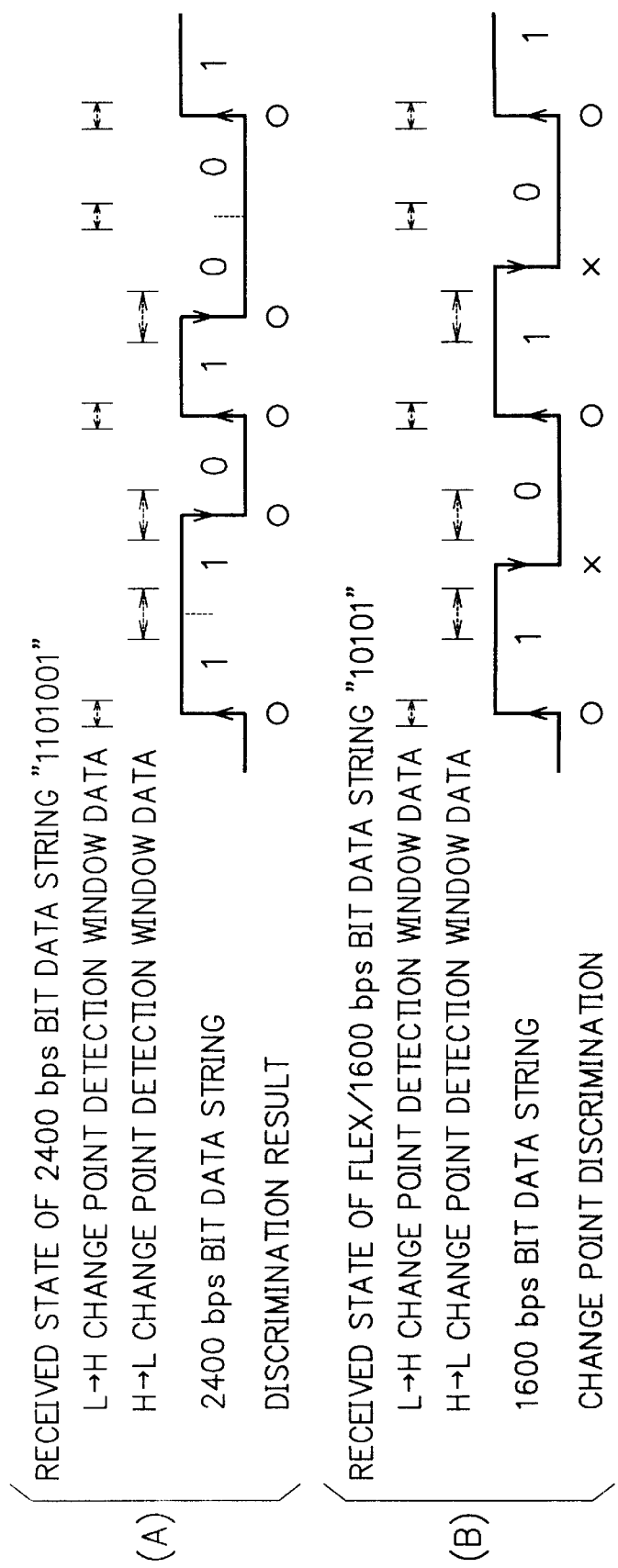

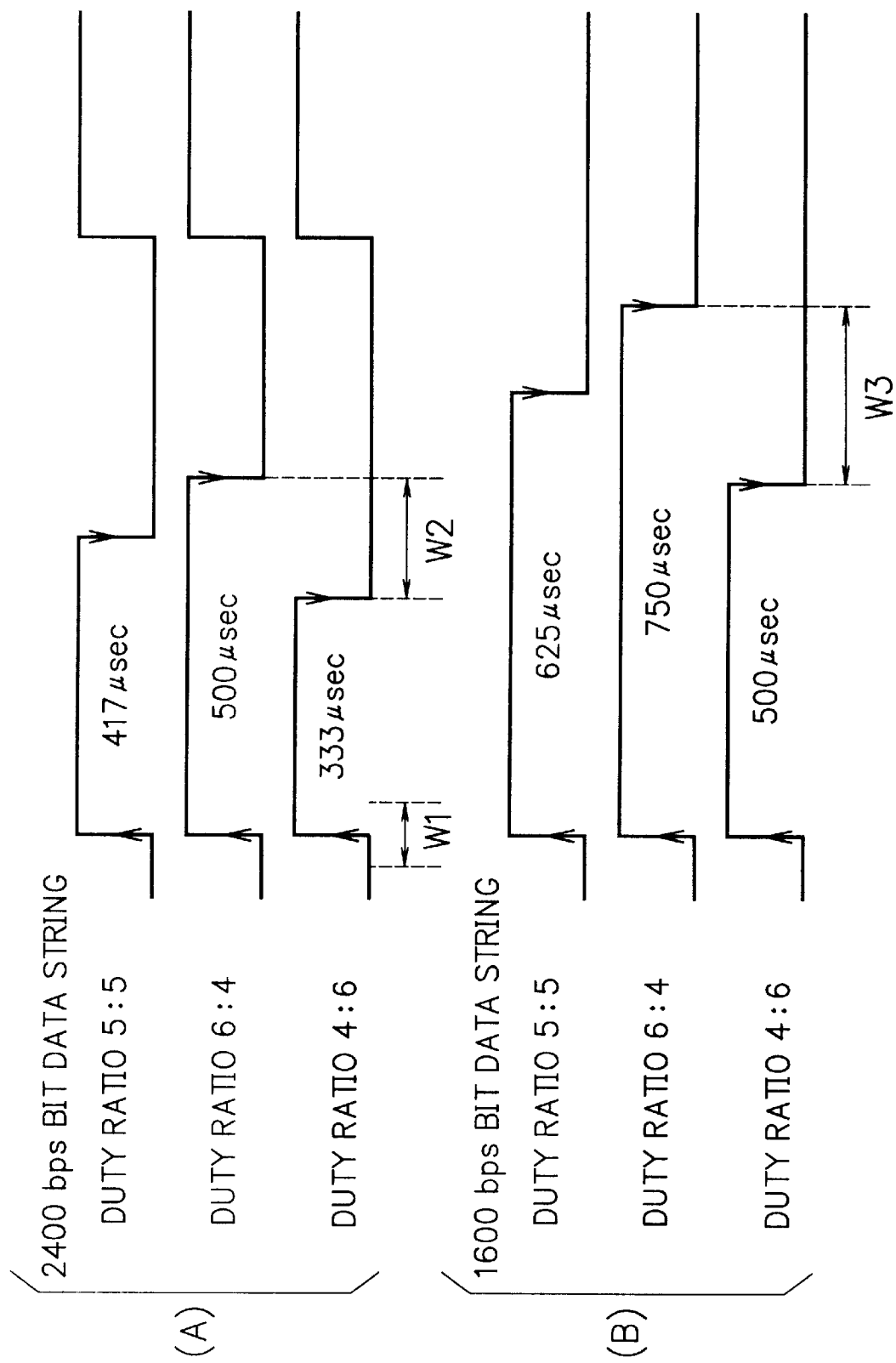

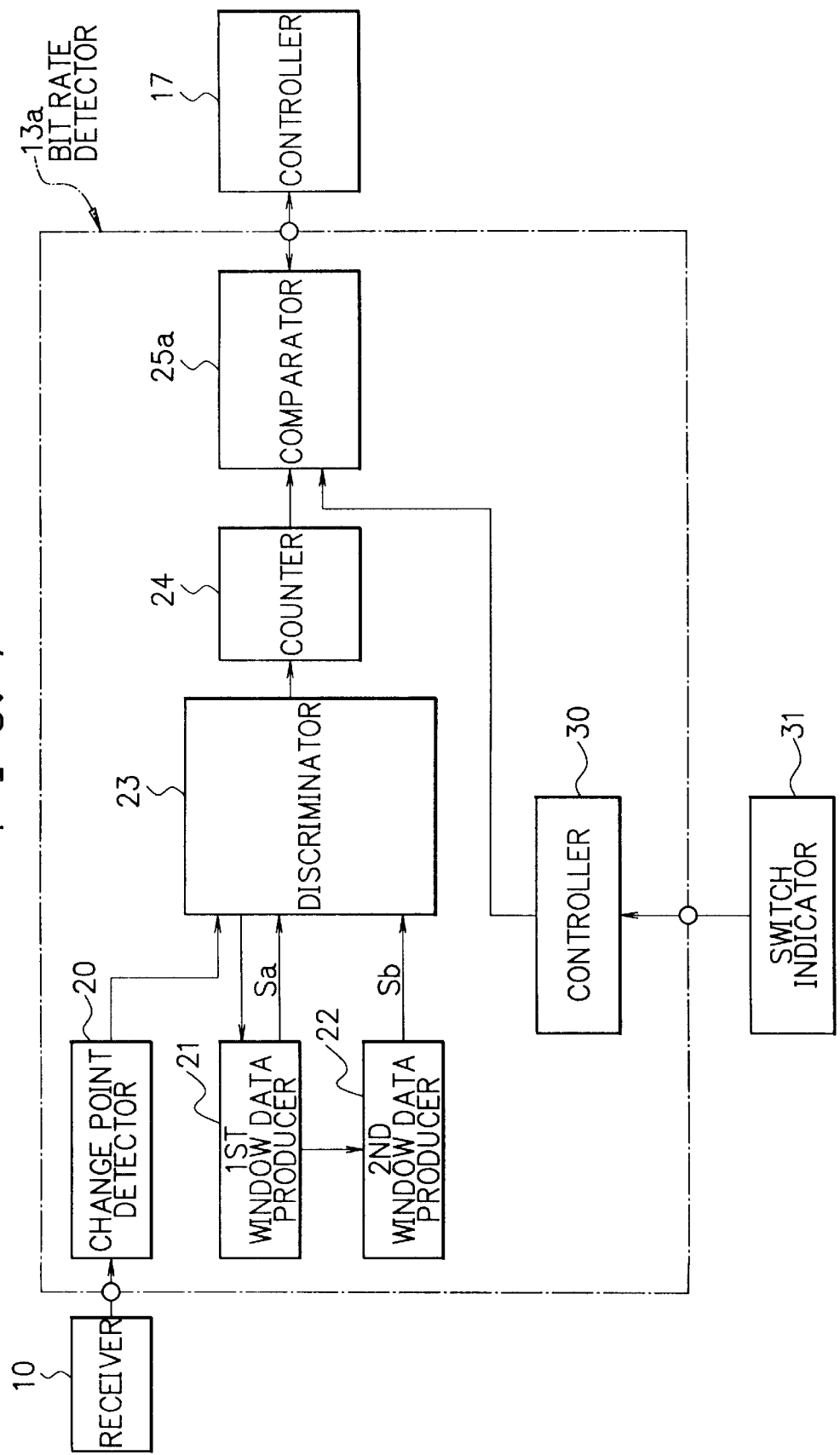

RADIO SELECTIVE PAGER

BACKGROUND OF THE INVENTION

The present invention relates to a radio selective pager for indicating a calling on receiving a general radio selective paging wave, and more particularly to a radio selective pager capable of preventing a malfunction caused by an erroneous synchronism on receiving a general radio selective paging wave of a different transmission rate.

DESCRIPTION OF THE RELATED ART

As a conventional transmission mode of a radio selective paging for indicating a calling on receiving a general radio selective paging wave, a POCSAG system at a transmission rate (bit rate) of 512 bps, 1200 bps, or 2400 bps has been known.

In a radio selective pager of this POCSAG system, when a received field strength is changed by fading due to a change of mobile position or multipath amid receiving a general radio selective paging wave, its synchronism can often break off. In such a case, the synchronism is restored by isolating bit data or a noise. In the case of the bit data cut off in this judgement, even when no preamble is received, the synchronism is restored from the remaining bit data of the demodulation data.

On this occasion, a contrivance is made so as not to invite an erroneous synchronism with a different transmission rate. Besides a protocol processing with this POCSAG system, a new protocol processing with a FLEX/ERMES system has been developed and is used in combination with the POCSAG system.

Accordingly, the radio selective pager of the POCSAG system can synchronize with a received wave of the FLEX/ERMES system except the POCSAG system. In the radio selective pager of this kind, a power saving for an internal battery is intended to prolong operation time and its life. For example, an intermittent power supply to a receiver is carried out in the absence of signal from a detection state of the preamble from the demodulation data, or a continuous power supply is executed in the presence of signals, processing the operation of a frame detection addressed to itself or an address collation. Thus, if the operation caused by the erroneous synchronism often occurs, the power saving efficiency for the internal battery is reduced, resulting in shortening its life.

The operation of the erroneous synchronization will be described as follows.

FIG. 1 shows a detection operation of a transmission rate (bit rate) in the POCSAG system and the FLEX/ERMES system. In this example, the bit rate is 2400 bps in the POCSAG system and 1600 bps in the FLEX/ERMES system. FIG. 1($a$) shows a set (position) state of change point detection windows (data) against the demodulation data of 2400 bps in the POCSAG system, and the change point detection windows are set at every leading change point from a low (L) level to a high (H) level every bit and at every trailing change point from the H level to the L level.

FIG. 1($b$) shows bit string data "1101001" of the demodulation data at 2400 bps in the POCSAG system, and FIG. 1($c$) a discrimination result against the bit string data "1101001" of the demodulation data at 2400 bps shown in FIG. 1($b$). In other words, the discrimination result shows whether or not the leading and trailing change points of the bit string data "1101001" of the demodulation data are positioned within the change point detection windows shown in FIG. 1($a$), and shows that all the leading change points are within the change point detection windows.

Moreover, FIG. 1($d$) shows bit string data "10101" of the demodulation data at 1600 bps in the FLEX/ERMES system, and FIG. 1($e$) shows a discrimination result against the bit string data "10101" of the demodulation data at 1600 bps shown in FIG. 1($d$). That is, the discrimination result shows whether or not the leading change points from the low level to the high level are positioned within the change point detection windows shown in FIG. 1($a$), and similarly to the case shown in FIG. 1($c$), shows that all the leading change points are within the change point detection windows.

As described above, in the conventional radio selective pager, at both 2400 bps in the POCSAG system and 1600 bps in the FLEX/ERMES system, the leading change points of the bit string of the demodulation data are positioned within the change point detection windows, and the pager cannot distinguish between the transmission rates of 2400 bps and 1600 bps.

Hence, when receiving a general radio paging wave at 1600 bps in the FLEX/ERMES system, the radio selective pager at 2400 bps in the POCSAG system synchronizes erroneously, and vice versa. As a result, the pager switches from the power saving (battery saving) mode to the continuous receive mode to transfer to a synchronism signal detection operation, and the continuous operation increases much, thereby reducing the power saving efficiency for the internal battery. Thus, in the conventional radio selective pager, the power supply time increases, and the life of the internal battery is reduced.

SUMMARY OF THE INVENTION

Accordingly, it is an object of the present invention to provide a radio selective pager in view of the aforementioned problems of the prior art, which is capable of preventing an erroneous synchronization with received signals of different transmission rates to avoid an erroneous switch operation from a power saving mode to a continuous receiving mode on receiving a general radio selective paging wave of a different transmission rate (bit rate), saving unnecessary continuous operations, improving power saving efficiency, and prolonging life of an internal battery.

In accordance with one aspect of the present invention, there is provided a radio selective pager which receives a general radio selection paging wave and indicates a selective paging to a user, comprising receiving means which inputs a received signal of a general radio selection paging wave and outputs demodulation data; and selective paging processing means which detects leading change points, rising from a low level to a high level, and trailing change points, falling from the high level to the low level, of bits of the demodulation data, counts a detection number of at least ones of the leading and the trailing change points, recognizes the received signal to be of a predetermined transmission rate when a count number of the detection number is coincident with a predetermined value, and indicates a selection paging to a user.

In a radio selective pager of the present invention, the selective paging processing means can detect the leading and the trailing change points of the bits of the demodulation data using change point detection windows having a time spacing.

In a radio selective pager of the present invention, preferably, a time spacing and a position of the change point detection windows for holding the trailing change points are determined so that the change point detection windows for holding the trailing change points may be not overlapped with any of the change point detection windows of different transmission rates.

In a radio selective pager of the present invention, the selective paging processing means includes bit synchronizing means for synchronizing the demodulation data output from the receiving means with an internal reference clock to output synchronized demodulation data; preamble detecting means for detecting a preamble from the demodulation data output from the bit synchronizing means; bit rate detecting means which detects the leading and the trailing change points of the bits of the demodulation data, counts the detection number of at least ones of the leading and the trailing change points, and recognizes the received signal to be of a predetermined transmission rate when the count number of the detection number is coincident with a predetermined value; frame signal detecting means for detecting a frame synchronizing signal from the demodulation data output from the bit synchronizing means; address collating means for collating address numbers of the demodulation data output from the bit synchronizing means with individual address numbers stored previously, and outputs an indication signal when the address number is coincident with the individual address number; and indicating means for indicating a selective paging to a user when the bit rate detecting means recognizes the received signal to be of the predetermined transmission rate and the address number of the demodulation data is coincident with the individual address number.

The bit rate detecting means includes a change point detector for detecting the leading and the trailing change points of the bits; a window data producer for producing data of the change point detection windows holding the leading and the trailing change points detected by the change point detector; a discriminator for discriminating whether or not the leading and the trailing change points of the bits are held within the change point detection windows produced by the window data producer; a counter for counting either the leading or the trailing change points of the bits held within the change point detection windows discriminated by the discriminator to output a count number; and a comparator for comparing the count number counted by the counter with a predetermined reference value, judges the received signal to be of a predetermined transmission rate when the count number is coincident with the predetermined reference value, and instructs the indicating means to do a paging operation.

The bit rate detecting means further includes variable set means for setting a variable reference value to be compared with the count number in the comparator for coping with a plurality of transmission rates.

In a radio selective pager of the present invention, the predetermined transmission rate can be any of a plurality of transmission rates in POCSAG system and FLEX/ERMES system.

In a radio selective pager according to the present invention, as both leading and trailing change points of bits of demodulation data are detected, a detection number of at least one change point is counted. When this count number is coincident with a predetermined value, the received signal is recognized to be paged at the predetermined transmission rate, and its selective paging is indicated to a user.

Hence, when a general radio selective paging wave of a different transmission rate of the POCSAG system or the FLEX/ERMES system is received, no erroneous synchronization is executed, and no erroneous switch operation from a power saving mode to a continuous receiving mode is taken place. As a result, the continuous receiving operation is reduced to improve the power saving efficiency and life of an internal battery can be prolonged.

Further, in another radio selective pager of the present invention, change point detection windows holding trailing change points of bits of demodulation data may not be overlapped with those of different transmission rates. As a result, even when a duty ratio of the bits of the demodulation data is changed by dispersion of characteristics of each radio selective pager, an erroneous detection of the change points due to the change point detection windows of a plurality of transmission rates cannot arise.

Moreover, in a further radio selective pager of the present invention, a reference value can be variable or changeable so as to cope with a plurality of transmission rates. As a result, one radio selective pager can cope with a plurality of transmission rates in the POCSAG system or the FLEX/ERMES system.

BRIEF DESCRIPTION OF THE DRAWINGS

The objects, features and advantages of the present invention will become more apparent from the consideration of the following detailed description, taken in conjunction with the accompanying drawings, in which:

FIG. 5 is a timing chart showing timing of operation of the bit rate detector shown in FIG. 3;

FIG. 6 is a timing chart showing an operation of the radio selective pager shown in FIG. 2 when a duty ratio of demodulation data is changed; and FIG. 7 is a block diagram of a second embodiment of a bit rate detector of a radio selective pager according to the present invention.

DESCRIPTION OF THE PREFERRED EMBODIMENTS

Figure 1:
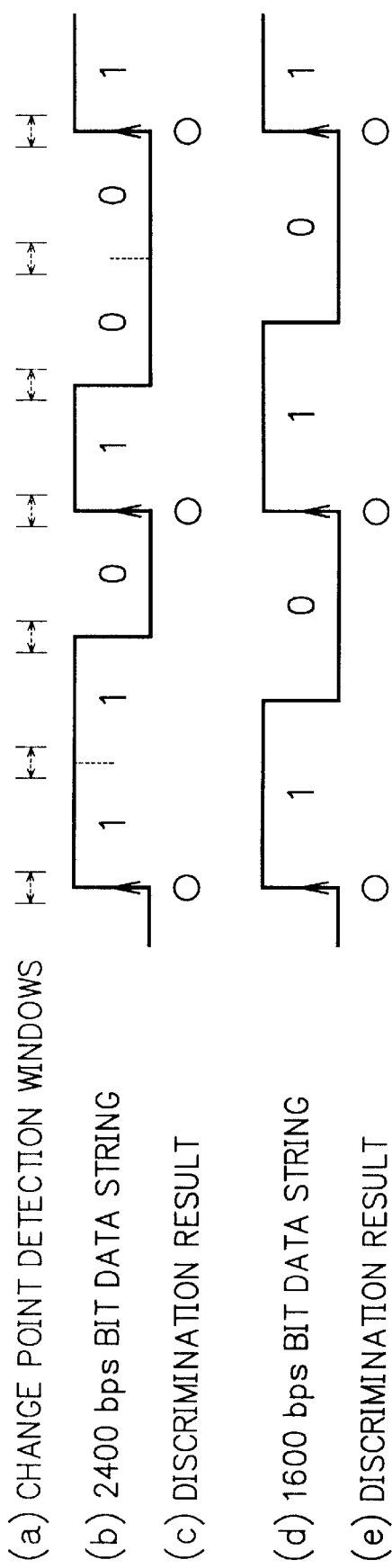
FIG. 1 is a timing chart showing a detection operation of a transmission rate in the conventional POCSAG and FLEX/ERMES systems.
Figure 2:
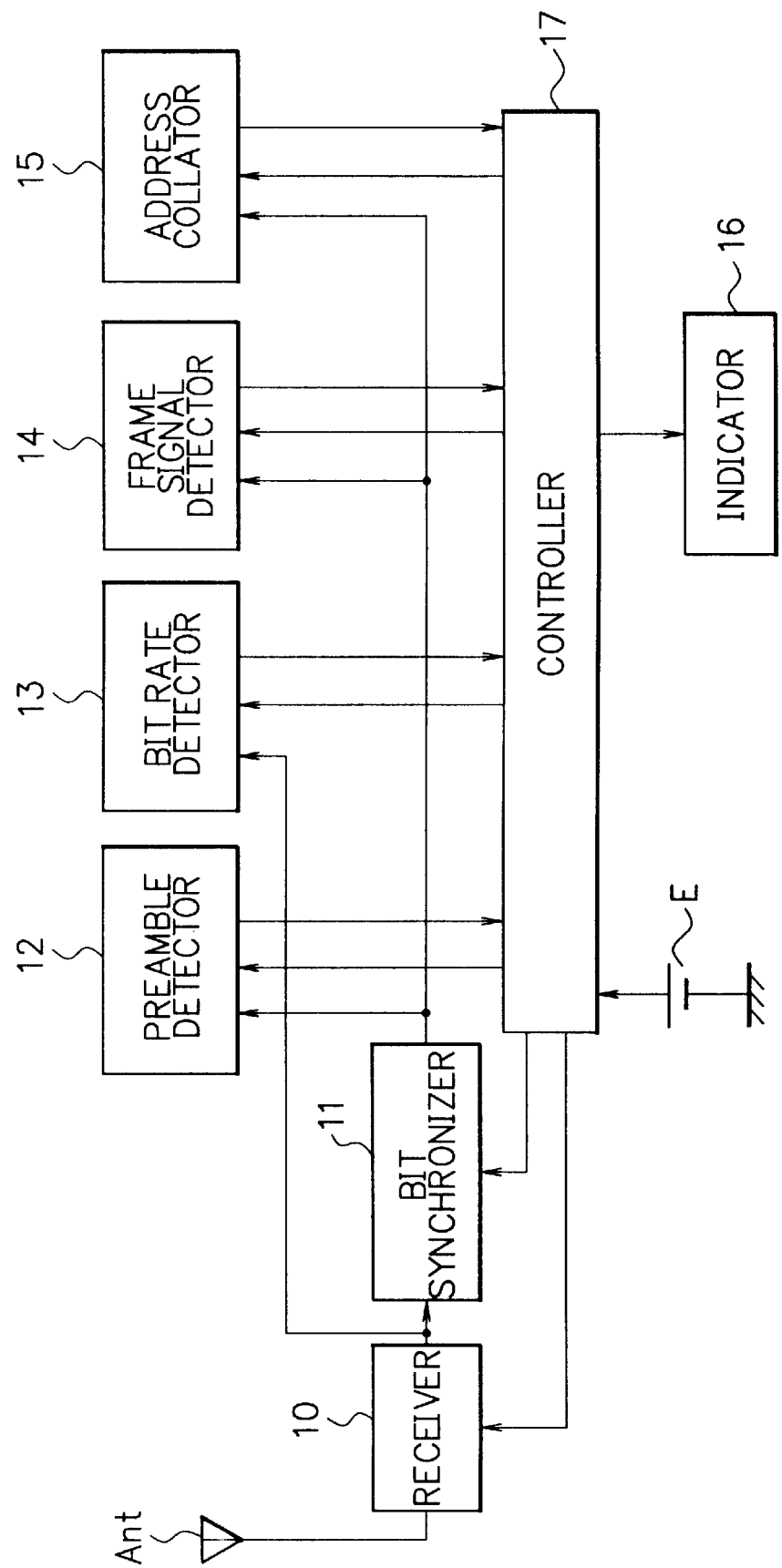
FIG. 2 is a block diagram of a radio selective pager according to one embodiment of the present invention.

Referring now to the drawings, there is shown in FIG. 2 a radio selective pager according to one embodiment of the present invention.

In FIG. 2, the radio selective pager comprises an antenna Ant for receiving a general radio selective paging wave of different transmission systems such as the POCSAG system and the FLEX/ERMES system, and a receiver 10 which inputs the received signal of the general radio selective paging wave received through the antenna Ant, amplifies the received signal, converts its frequency, and outputs demodulation data.

The radio selective pager further comprises a bit synchronizer 11 for synchronizing the bits of the demodulation data output from the receiver 10 with an internal reference clock, a preamble detector 12 for detecting a preamble of the demodulation data sent from the bit synchronizer 11 to output a preamble detection result, a bit rate detector 13 for recognizing whether or not the radio selective pager processes the predetermined transmission rate to enable a selective paging receiving, and a frame signal detector 14 for detecting a frame synchronizing signal.

Moreover, the radio selective pager further comprises an address collator 15 for collating address numbers of the demodulation data with individual address numbers stored previously, an indicator 16 for indicating the selective paging to a user by an intermittent sound or a vibration, and a controller 17 for controlling the entire parts described above.

Figure 3:
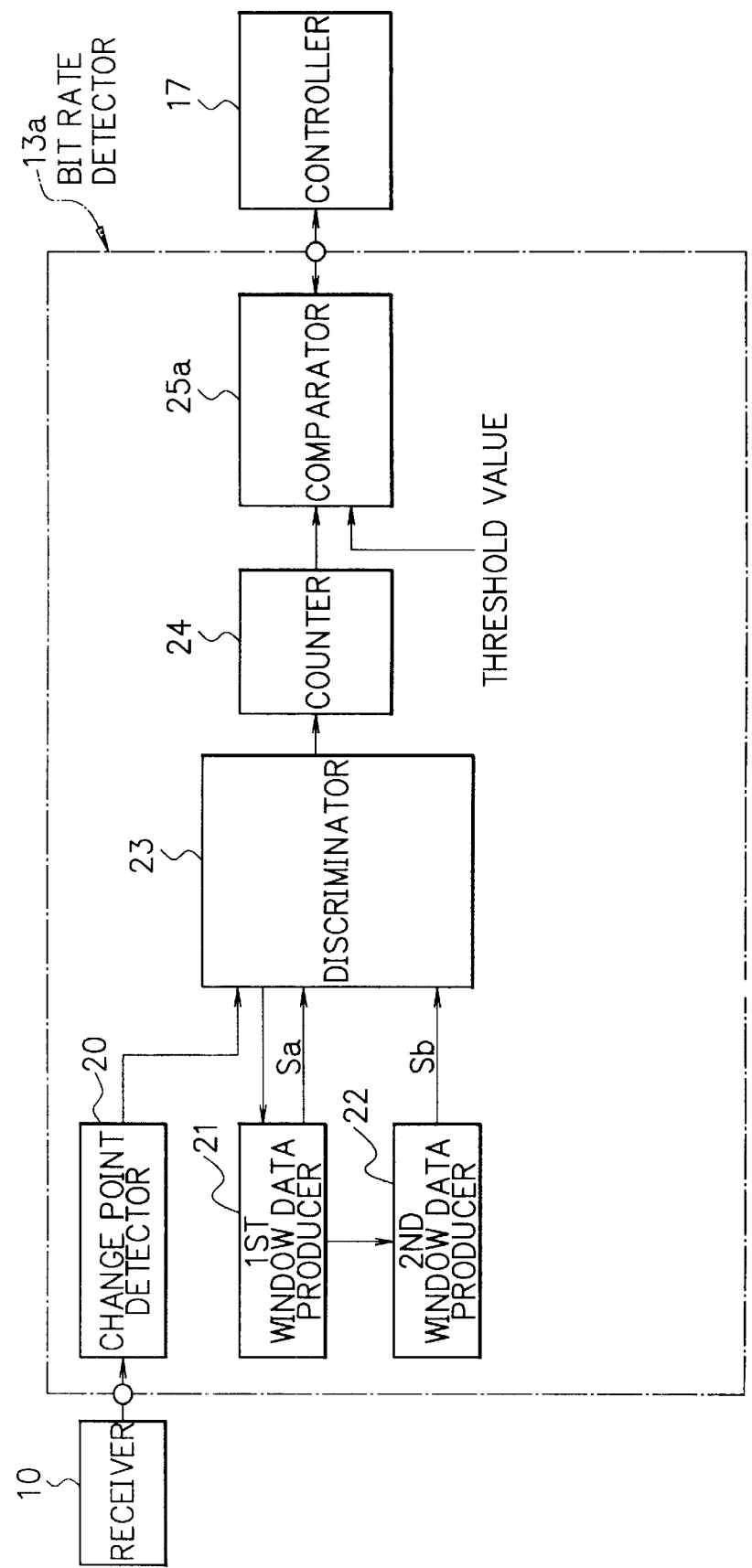
FIG. 3 is a block diagram of a first embodiment of a bit rate detector shown in FIG. 2.

FIG. 3 illustrates a first embodiment of the bit rate detector 13 shown in FIG. 2.

The bit rate detector 13 includes a change point detector 20 for detecting leading change points from a low level to a high level every bit and trailing change points from the high level to the low level of the demodulation data, a first window data producer 21 for producing first change point detection windows (data) Sa as a time spacing holding the leading change points detected by the change point detector 20 to output the first change point detection windows Sa to a discriminator 23, and a second window data producer 22 for producing second change point detection windows (data) Sb as a time spacing holding the trailing change points detected by the change point detector 20 to output the second change point detection windows Sb to the discriminator 23.

The bit rate detector 13 further includes the discriminator 23 for discriminating whether or not the leading and trailing change points of the bits of the demodulation data output from the receiver 10 are positioned within the respective first and second change point detection windows, a counter 24 for counting the number of which the discriminator 23 discriminates that each leading change point is held within the respective first change point detection window Sa to output a count number, and a comparator 25 for comparing the count number of the counter 24 with a predetermined reference (threshold) value and, when the count number is coincident with the predetermined reference value, outputs a right receiving signal representing that the radio selective pager receives the general radio selective paging wave of the desired transmission rate to the controller 17.

Next, an operation of the radio selective pager described above will be described in detail in connection with FIG. 2.

In FIG. 2, the antenna Ant receives a signal of a general radio selection paging wave of the POCSAG system or the FLEX/ERMES system, and the received signal is input to the receiver 10. The receiver 10 amplifies this received signal, converts its frequency, and outputs the demodulation data to the bit synchronizer 11. The bit synchronizer 11 synchronizes the bits of the demodulation data with the internal reference clock.

The preamble detector 12 receives the demodulation data from the bit synchronizer 11 and detects the preamble of the demodulation data to output the preamble detection result to the controller 17. The controller 17 discriminates if the preamble is detected. When no preamble is detected, the controller 17 permits a power source E to make an intermittent power supply to the receiver 10. On the other hand, when the preamble is detected, the controller 17 allows the power source E to carry out a continuous power supply to the receiver 10 and actuates the frame signal detector 14.

When the frame signal detector 14 detects a frame synchronization signal, the controller 17 controls so that the power is supplied to the receiver 10 in only its own frame, and actuates the address collator 15. The address collator 15 collates the address number of the received signal of the general radio selective paging wave with its individual address number stored previously. When both the address numbers are coincident with each other, the address collator 15 outputs an indication signal to the controller 17, and the controller 17 controls the indicator 16 to indicate the selective paging to the user.

Figure 4:
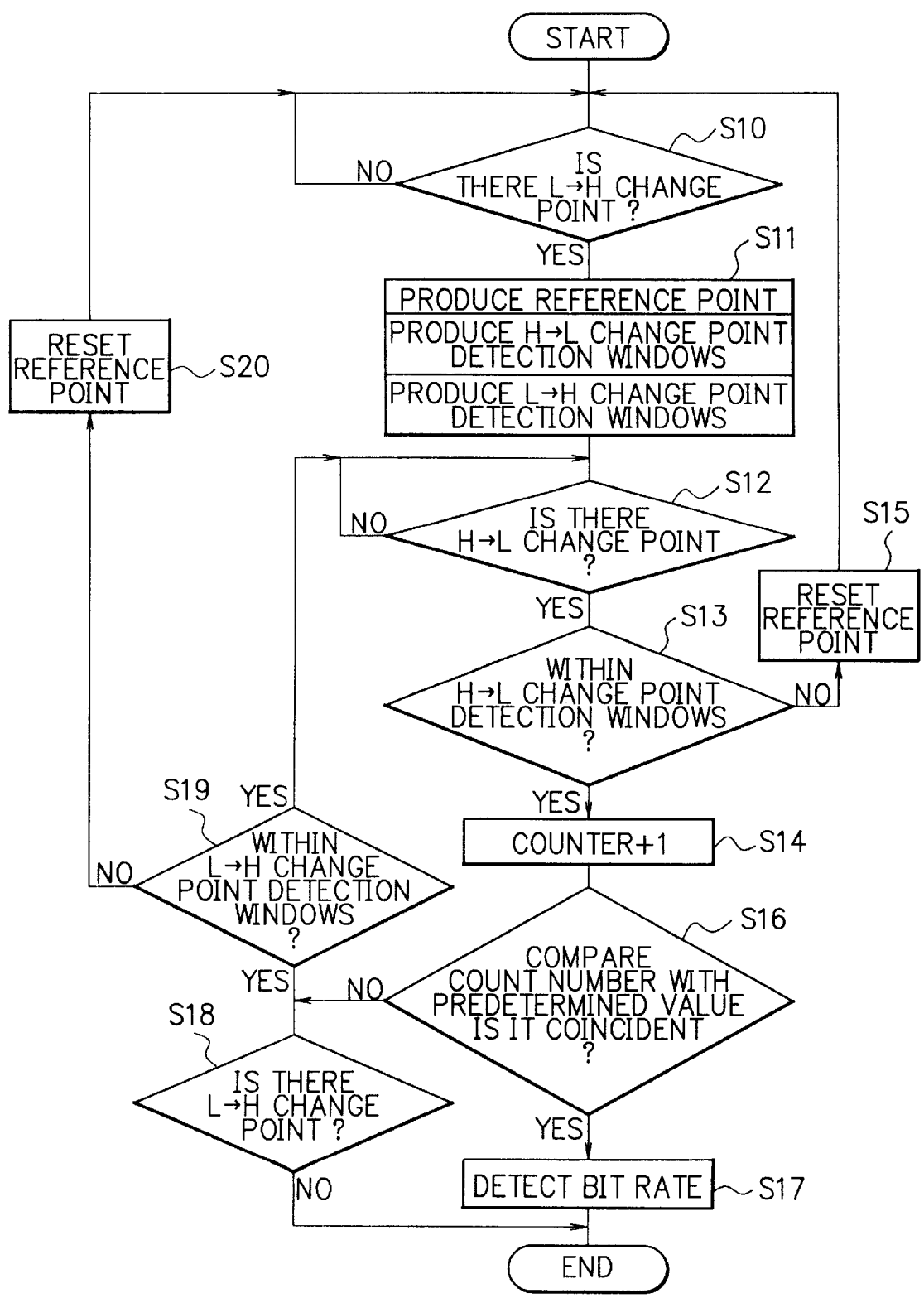
FIG. 4 is a flow chart showing an operation of the bit rate detector shown in FIG. 3.

A processing of the bit rate detector 13 shown in FIG. 3 will be described in detail with reference to FIG. 4. FIG. 4 shows an operation of the bit rate detector 13.

In FIG. 4, the change point detector 20 inputs the demodulation data from the receiver 10 and detects the leading change points from the low level to the high level every bit of the demodulation data and the trailing change points from the high level to the low level every bit in step S10.

The detected change point data are sent from the change point detector 20 to the discriminator 23, and the discriminator 23 outputs the change point data to the first and the second window data producers 21 and 22. The first window data producer 21 produces the first change point detection windows Sa as the time spacing holding the leading change point (data) of the bits of the demodulation data and sends the first change point detection windows Sa to the discriminator 23, and similarly, the second window data producer 22 produces the second change point detection windows Sb as the time spacing holding the trailing change point (data) of the bits of the demodulation data and sends the second change point detection windows Sb to the discriminator 23 in step S11. The time spacing of the second change point detection window Sb is usually determined to be larger than that of the first change point detection window Sa, as hereinafter described in detail in connection with FIGS. 5 and 6.

The discriminator 23 discriminates whether or not the trailing change point is held within the second change point detection window Sb in step S13. When the trailing change point is held within the second change point detection window Sb, the counter 24 is counted up and awaits until the next trailing change point in steps S12, S13 and S14. On the other hand, when the trailing change point is not held within the second change point detection window Sb in step S13, the counter 23 is reset and the change point data sent from the change point detector 20 are canceled in step S15. That is, this means an erroneous signal receiving of the general radio selection paging wave of unreceivable transmission rate. In this embodiment, the counter 24 may count until the discriminator 23 discriminates whether or not both the leading and the trailing change points are held within the first and the second change point detection windows Sa and Sb.

The count number of the counter 24 is sent to the comparator 25, and the comparator 25 compares the count number with the predetermined reference value (corresponding to a receivable transmission rate of the selective paging in this radio selective pager). When the count number is coincident with the predetermined reference value, the comparator 25 judges the received signal of the predetermined transmission rate, and the controller 17 takes in the comparison result in steps S16 and S17.

The controller 17 then recognizes the received signal of the general radio selective paging wave to be addressed to own radio selective pager, releases the power saving (battery saving) mode, turns to the continuous receiving mode, and moves to the synchronizing signal detection operation.

When the count number of the counter 24 is not coincident with the predetermined reference value in step S16, it is discriminated whether or not there is the leading change point of the bit of the demodulation data during receiving, and it is discriminated whether or not this leading change point is held within the first change point detection window Sa in steps S18 and S19.

When the leading change point is held within the first change point detection window Sa in step S19, return to step 12, process from the next leading change point, and detect the transmission rate. Alternatively, when the leading change point is not held within the first change point detection window Sa in step S19, similarly to step S15, reset the counter 24 and cancel the change point data output from the change point detector 20 in step S20.

FIG. 5 illustrates timing operations of the bit rate detector 13 shown in FIG. 3. For instance, FIG. 5(A) shows a timing processing at 2400 bps in the POCSAG system, and FIG. 5(B) shows a timing processing of the bit string data "10101" of the demodulation data at 1600 bps in the FLEX/ERMES system.

In the case of the demodulation data of 2400 bps shown in FIG. 5(A), the first and the second window data producers 21 and 22 produce the first and the second change point detection windows Sa and Sb holding the leading and the trailing change points every bit of the demodulation data detected by the change point detector 20, and the first and the second change point detection windows Sa and Sb are set in the discriminator 23. The discriminator 23 discriminates the leading and the trailing change points, and it is found that the leading and the trailing change points of the bits of the demodulation data at 2400 bps are held within the first and the second change point detection windows Sa and Sb, respectively.

On the contrary, in the case of the demodulation data of 1600 bps shown in FIG. 5(B), it is understood that the leading change points of the bits of the demodulation data are held within the first change point detection windows Sa, but the trailing change points of the same are not held within the second change point detection windows Sb.

Accordingly, in the case of the demodulation data of 1600 bps in the FLEX/ERMES system, the counter 24 cannot count up their bits, and the demodulation data are canceled. That is, in the comparator 25, the count number of the counter 24 is not coincident with the predetermined reference value (corresponding to the receivable transmission rate of the selective paging in the radio selective pager). Hence, the controller 17 judges the received signal of the general radio selective paging wave not to be addressed to own radio selective pager. In other words, the power saving (battery saving) mode is not released, and the switch to the continuous receiving mode is not executed. As a result, the continuous power supply to the receiver 10 from the power source E is not carried out, and the power saving can be achieved.

FIG. 6 shows an operation of the radio selective pager shown in FIG. 2 when a duty ratio of received (demodulation) data is changed by dispersion of characteristics of each radio selective pager. For instance, FIG. 6(A) shows demodulation data of 2400 bps in the POCSAG system, and FIG. 6(B) shows demodulation data of 1600 bps in the FLEX/ERMES system.

In FIG. 5(A), a duty ratio of received (demodulation) data is changed depending on dispersion of characteristics of each radio selective pager. In this embodiment, it is assumed that the duty ratio is changed from 4:6 to 6:4. In the case of a duty ratio of 5:5, the change position from the starting to the trailing of the demodulation data of 2400 bps, i.e., the high level bit spacing is 417 $\mu$sec, and in the case of a duty ratio of 6:4 to 4:6 (the high level bit spacing is 500 $\mu$sec to 333 $\mu$sec), the bit spacing changes in a time spacing W2 at the trailing edge.

When a variable time spacing at the trailing edge is determined to be narrow, compared with the time spacing W2, like a time spacing W1 of the first change point detection window Sa for the leading change point of the bit of the demodulation data, the trailing change points of the demodulation data with the duty ratio of 6:4 to 4:6 (the high level bit spacing is 500 $\mu$sec to 333 $\mu$sec) can be off the second change point detection window Sb. Thus, as regards the time spacing for the trailing change points, the second change point detection window Sb having a wider time spacing than that of the first change point detection window Sa is set, as shown in FIG. 5.

The second change point detection window Sb of 2400 bps is determined so as not to overlap with the second change point detection window Sb of 1600 bps. That is, as shown in FIG. 5(B), in the case of a duty ratio of 5:5, the high level bit spacing of the demodulation data of 1600 bps is 625 $\mu$sec, and in the case of a duty ratio of 6:4 to 4:6 (the high level bit spacing is 750 $\mu$sec to 555 $\mu$sec), the bit spacing changes in a time spacing W3 at the trailing edge.

Further, the time spacing of the first change point detection window Sa and its position are determined so that the leading change point of the bit spacing having 500 $\mu$sec in the maximum duty ratio 6:4 shown in FIG. 6(A) may be held within the time spacing W3. As a result, even when the duty ratio of the received (demodulation) data is changed by dispersion of characteristics of each radio selective pager, the predetermined transmission rate can be exactly detected.

FIG. 7 illustrates a second embodiment of a bit rate detector of a radio selective pager according to the present invention.

In this embodiment, as shown in FIG. 7, the bit rate detector 13a has a similar construction to the first embodiment shown in FIG. 3 except that another comparator 25a, a controller 30 and a switch indicator 31 are included. Although one reference value corresponding to one transmission rate is predetermined in the bit rate detector 13 shown in FIG. 3, a reference value can be variable or changeable so as to cope with respective general radio selective pagings corresponding to a plurality of transmission rates.

In FIG. 7, in the bit rate detector 13a, in response to an instruction of the switch indicator 31, the controller 30 controls the reference value to be variable or changeable for setting it to the comparator 25a in order to distinguish a pertinent transmission rate from the respective demodulation data of a plurality of transmission rates. As a result, one radio selective pager can cope with a plurality of transmission rates in the POCSAG system or the FLEX/ERMES system.

As described above, in a radio selective pager according to the present invention, as both leading and trailing change points of bits of demodulation data are detected, a detection number of at least one change point is counted. When this count number is coincident with a predetermined value, the received signal is recognized to be paged at the predetermined transmission rate, and its selective paging is indicated to a user.

Hence, when a general radio selective paging wave of a different transmission rate of the POCSAG system or the FLEX/ERMES system is received, no erroneous synchronization is executed, and no erroneous switch operation from a power saving mode to a continuous receiving mode is taken place. As a result, the continuous receiving operation is reduced to improve the power saving efficiency and life of an internal battery can be prolonged.

Further, in another radio selective pager of the present invention, change point detection windows holding trailing change points of bits of demodulation data may not be overlapped with those of different transmission rates. As a result, even when a duty ratio of the bits of the demodulation data is changed by dispersion of characteristics of each radio selective pager, an erroneous detection of the change points due to the change point detection windows of a plurality of transmission rates cannot arise.

Moreover, in a further radio selective pager of the present invention, a reference value can be variable or changeable so as to cope with a plurality of transmission rates. As a result, one radio selective pager can cope with a plurality of transmission rates in the POCSAG system or the FLEX/ERMES system.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A radio selective pager which receives a general radio selection paging wave and indicates a selective paging to a user, comprising:
   receiving means which receives the general radio selection paging wave and outputs demodulation data; and
   selective paging processing means which detects both leading change points, rising from a low level to a high level, and trailing change points, falling from the high level to the low level, of bits of the demodulation data, counts a detection number of at least ones of the leading and the trailing change points, recognizes the received signal to be of a predetermined transmission rate when a count number of the detection number is coincident with a predetermined value, and indicates a selection paging to a user.

2. A radio selective pager of claim 1, wherein the selective paging processing means detects the leading and the trailing change points of the bits of the demodulation data with change point detection windows having a time spacing.

3. A radio selective pager of claim 2, wherein the time spacing and a position of the change point detection windows for holding the trailing change points are determined so that the change point detection windows for holding the trailing change points are not overlapped with any of the change point detection windows of different transmission rates.

4. A radio selective pager of claim 1, wherein the selective paging processing means includes:
   bit synchronizing means for synchronizing the demodulation data output from the receiving means with an internal reference clock to output synchronized demodulation data;
   preamble detecting means for detecting a preamble from the demodulation data output from the bit synchronizing means;
   bit rate detecting means which detects the leading and the trailing change points of the bits of the demodulation data, counts the detection number of at least ones of the leading and the trailing change points, and recognizes the received signal to be of a predetermined transmission rate when the count number of the detection number is coincident with a predetermined value;
   frame signal detecting means for detecting a frame synchronizing signal from the demodulation data output from the bit synchronizing means;
   address collating means for collating address numbers of the demodulation data output from the bit synchronizing means with individual address numbers stored previously, and outputs an indication signal when the address number is coincident with the individual address number; and
   indicating means for indicating a selective paging to a user when the bit rate detecting means recognizes the received signal to be of the predetermined transmission rate and the address number of the demodulation data is coincident with the individual address number.

5. A radio selective pager of claim 4, wherein the bit rate detecting means includes:
   a change point detector for detecting both the leading and the trailing change points of the bits;
   a window data producer for producing data of the change point detection windows holding the leading and the trailing change points detected by the change point detector;
   a discriminator for discriminating whether or not the leading and the trailing change points of the bits are held within the change point detection windows produced by the window data producer;
   a counter for counting either the leading or the trailing change points of the bits held within the change point detection windows discriminated by the discriminator to output a count number; and
   a comparator for comparing the count number counted by the counter with a predetermined reference value, judges the received signal to be of a predetermined transmission rate when the count number is coincident with the predetermined reference value, and instructs the indicating means to do a paging operation.

6. A radio selective pager of claim 5, wherein the bit rate detecting means further includes variable set means for setting a variable reference value to be compared with the count number in the comparator for coping with a plurality of transmission rates.

7. A radio selective pager of claim 1. wherein the predetermined transmission rate is any of a plurality of transmission rates in POCSAG system and FLEX/ERMES system.

8. A radio selective pager comprising:
   a receiving unit operative to receive a general radio selection paging wave and output demodulation data; and
   a processing circuit operative to, detect both leading change points, rising from a low level to a high level, and trailing change points, falling from the high level to the low level, of bits of the demodulation data, count a detection number of at least ones of the leading and the trailing edge points, recognize the received signal to be of a predetermined transmission rate when a count number of the detection number coincides with a predetermined value, and indicate a selection paging to a user.

9. The radio selective pager according to claim 8, wherein the processing unit detects the leading and trailing change points of the bits of demodulation data with change points detection windows having a time spacing.

10. The radio selective pager according to claim 9, wherein the time spacing and a position of the change point detection windows for holding the trailing change points are selected so that the change point detection windows for holding the trailing change points do not overlap any of the change point detection windows of different transmission rates.

11. The radio selective pager according to claim 8, wherein the processing circuit comprises, a bit synchronizer;

a preamble detector; a bit rate detector; a frame signal detector; an address collator; an indicator; and a controller unit, wherein all of the foregoing components communicate with said controller unit.

12. The radio selective pager according to claim 11, wherein the bit rate detector comprises, a change point detector for detecting the leading and trailing change points of the bits; a window data producer for producing data of the change point detection window holding the leading and the trailing change points detected by the change point detector; a discriminator for discriminating whether or not the leading and the trailing change points of the bits are held within the change point detection windows produced by the window data producer; a counter for counting either the leading or the trailing change points of the bits held within the change point detection windows discriminated by the discriminator to output a count number; and a comparator for comparing the count number counted by the counter with a predetermined reference value and judging the received signal to be of a predetermined transmission rate when the count number is coincident with the predetermined reference value, and instructing the indicator to indicate a paging operation.

13. The radio selective pager according to claim 12, wherein the bit rate detector is operative to be variably set to store a variable reference value to be compared with the count number output by said counter for coping with a plurality of transmission rates.

14. The radio selective pager according to claim 8, wherein the predetermined transmission rate is any of the plurality of transmission rates in POCSAG and FLEX/ERMES protocols.

* * * * *